United States Patent [19]

Apfel

[11] 4,388,893

[45] Jun. 21, 1983

[54] DIESEL ENGINE INCORPORATING EMULSIFIED FUEL SUPPLY SYSTEM

[75] Inventor: Richard Apfel, New York, N.Y.

[73] Assignee: Cedco, Incorporated, New York, N.Y.

[21] Appl. No.: 174,852

[22] Filed: Aug. 4, 1980

[51] Int. Cl.³ .......................................... F02D 19/00
[52] U.S. Cl. .............................. 123/25 J; 123/25 E; 123/25 C; 123/198 A
[58] Field of Search ................ 123/25 C, 25 D, 25 E, 123/25 R, 25 A, 25 I, 1 A, 198 A

[56] References Cited

U.S. PATENT DOCUMENTS

| | | | |
|---|---|---|---|
| 1,611,429 | 12/1926 | Fish | 123/25 E |
| 2,319,858 | 5/1943 | Grow | 123/25 E |
| 3,749,097 | 7/1973 | Grow | 123/25 E |
| 3,763,832 | 10/1973 | Fenne | 123/25 C |
| 3,908,613 | 9/1975 | Loby | 123/25 C |
| 3,921,599 | 11/1975 | Grow | 123/25 E |
| 3,933,132 | 1/1976 | Kishishita | 123/25 C |
| 4,167,919 | 9/1979 | Woolley et al. | 123/25 E |

Primary Examiner—Ira S. Lazarus
Attorney, Agent, or Firm—Anthony H. Handal; Michael N. Meller

[57] ABSTRACT

A fuel supply system for producing an emulsified fuel continuously is disclosed. The emulsion is maintained by recirculating the emulsion and adding a ratio of fuel and water to the system to achieve a desired fuel/water ratio in the recirculation loop.

8 Claims, 3 Drawing Figures 4,388,893

DIESEL ENGINE INCORPORATING EMULSIFIED FUEL SUPPLY SYSTEM

TECHNICAL FIELD

The invention relates to an internal combustion engine fueled by a relatively heavy petroleum products, such as diesel fuel. The engine incorporates a fuel supply system which generates a controlled emulsion of fuel oil and water which is fed into a cylinder of substantially conventional design.

BACKGROUND ART

Water addition to internal combustion systems has been of passing interest for varied reasons since the 1930's. As early as 1935 the use of water injection for suppression of knock in spark ignition engines was investigated. Generally a number of techniques for adding water to fuel prior to combustion, for a multitude of purposes, have been investigated since the early 1920's.

Some of the advantages of water addition to fuel results from a decrease in the combustion temperatures. These temperature reductions result in the suppression of spark-knock and preignition in the engine as well as the reduction of exhaust $NO_x$ concentrations and smoke, and lower fuel consumption.

During the Second World War water injection was employed to maintain the mechanical integrity of aircraft engines during high power output. In the 1970's interest in emulsified fuels for use in diesel engines was renewed because of the possibility of reducing the pollutants emitted by automobiles.

Emulsified fuels are even more attractive today since not only do they reduce the emission of pollutants but even offer the possibility of increased power output and decreased fuel consumption. Generally, there are three ways in which water is introduced into the cylinder of an internal combustion engine. First is the fumigation or carburetion of the water into the intake manifold which results in a slight decrease in $NO_x$ emissions and preignition combustion suppression. Such systems are low in cost, have minimal installation problems and may be easily retro-fitted to existing engines. The primary problem with fumigation is that it is not effective in increasing efficiencies or reducing fuel consumption.

An alternative approach is the direct injection of water into the cylinder of the engine. This results in a substantial decrease in $NO_x$ production, suppression of knock and slight soot reduction. Nevertheless, such a system suffers from a number of substantial disadvantages, namely, high installation costs, high initial equipment costs (this technique requires a redesign of the engine) and little increase in efficiency.

The third approach to the problem of water injection is the fueling of an engine with a fuel/water emulsion. This results in a substantial decrease in $NO_x$ emission, soot production, $CO_x$ emissions and odor. Moreover, engines fueled with emulsions exhibit an increase in output power and thermal efficiency. These advantages plus the possibility of easily and economically retrofitting existing equipment evidence the excellent possibilities for the practical use of emulsified fuel systems.

In spite of the theoretical potential of emulsified fuel systems, practical considerations have resulted in some questions as to the feasibility of commercially implementing such systems in the proximate future. In a recent work on emulsified fuel published by the A.S.M.E. (Paper No. 78224) entitled *"Experimental Reduction of $NO_x$ Smoke and BSFC in a Diesel Engine Using Uniquely Produced Water (0–80%) to Fuel Emulsion"* considers the problems of practical applications to be as follows:

1. Control of the water/oil emulsion under varying engine load conditions.
2. Durability of the engine and the water injection equipment.
3. Water freezing in the system, especially in colder climates.
4. Necessity of having a water tank to supply water for the emulsion.
5. Deterioration of the lubricating oil in the engine.

Thus, while preparing a fuel/water emulsion for combustion in a diesel engine appears a practical possibility, the development of a simple and reliable method for producing the emulsion and feeding it to the engine involves many considerations. One technique is to produce the emulsion with mechanical equipment, storing the emulsion using an emulsifying agent to maintain the stability of the emulsion. However, this technique has a number of drawbacks. Specifically, the emulsion can only be maintained in storage for a limited period of time before it begins to separate. In addition, pollutants produced by the burning of the emulsifying agent during combustion have proven to be very harmful, thereby defeating one of the main purposes of the using an emulsion.

A second approach to the problem of emulsion production is mechanical emulsification of the fuel just prior to injection into the cylinder. This way the problems involved with storing the emulsion and the disadvantages of using an emulsifying agent are eliminated. The major difficulty with this approach is controlling the fuel/water under a variety of engine conditions. This problem is especially acute in view of the complexities of the operation of a diesel engine and the variation of its parameters under actual operating contitions. Thus, most practical systems have gone in the direction of basic modification of engine design or the like.

DISCLOSURE OF INVENTION

The invention as claimed is intended to provide a remedy. It solves the problem of providing a diesel engine including an emulsified fuel supply system, without such problems as emulsion separation or the freezing of water in the system, without the need for emulsifying agents.

The inventive system for generating an emulsified fuel, comprises a first reservoir means for containing a quantity of a fuel component and a second reservoir means for containing a quantity of a non-combustible emulsion component. A chamber means defines a mixing chamber having an input for receiving the fuel component and the non-combustible emulsion component and providing both of the components at its output.

An emulsifier means receives both of the components from the chamber means, and provides an emulsion at its output. At least a portion of the output of the emulsifier means is sent to a device which consumes the emulsion Recirculation means receives that portion of the emulsion not provided to the device and returns it to the chamber means, allowing that portion not provided to the device to be returned to the emulsifier.

BRIEF DESCRIPTION OF DRAWINGS

One way of carrying out the invention is described below in detail with reference to drawings which illustrate only one specific embodiment, in which.

BEST MODE FOR CARRYING OUT THE INVENTION

Figure 1:
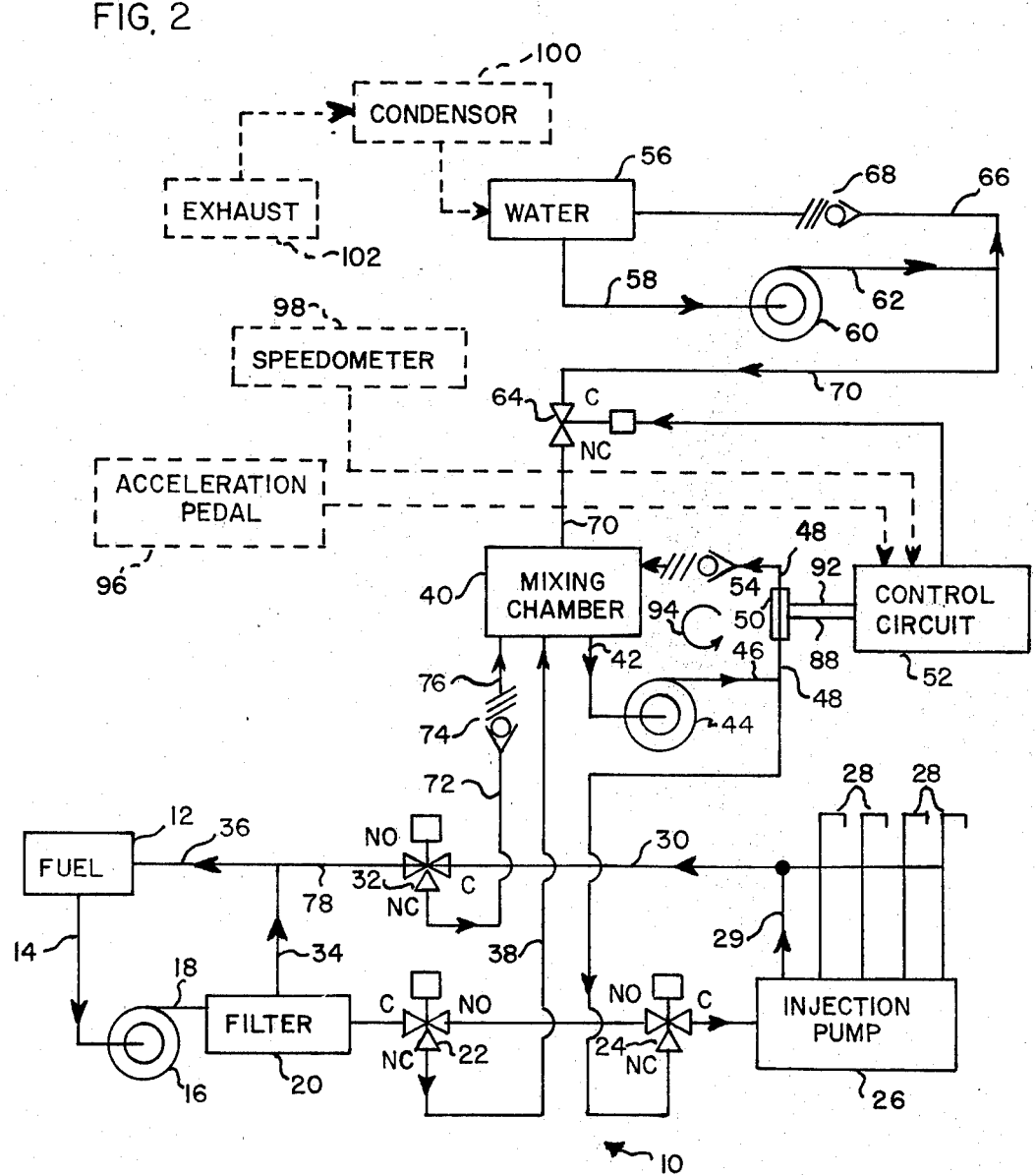
FIG. 1 is a schematic diagram of an internal combustion engine emulsion supply system constructed in accordance with the present invention.

Referring to FIG. 1, a system 10 for producing an oil/water emulsion for fueling a diesel engine in accordance with the present invention is illustrated. System 10 includes a fuel tank 12, which feeds fuel through a line 14 to a pump 16. The output of pump 16 is coupled by a line 18 to a filter 20 whose output is coupled to the common port C of valve 22. Valve 22 is of the type which includes a common port C, a normally open port NO and a normally closed port NC. In its deactivated state, valve 22 passes the fuel from its common port C to its normally open port NO. Its port NC is closed in this state. Upon activation of valve 22 the fluid being fed into common Port C is diverted to the normally closed port NC which is open during activation. The fluid is prevented from escaping through the normally open port NO by closing Port NO during activation. The normally open port of valve 22 is fed into the normally open port of valve 24 whose common port C is coupled to an injection pump 26.

Injection pump 26 feeds injectors 28, each of which injectors inject fuel into a cylinder of the engine. Excess fuel from injection pump 26 and the individual injectors 28 is returned via line 29 to a line 30 which leads to the common port of valve 32 which in its unactivated state couples the excess fuel to its normally open port NO, where the excess joins the excess fuel leaving filter 20 via line 34 and together with the excess fuel in line 34 is returned by a line 36 to the fuel tank 12.

During conventional operation of the engine, valves 22, 24, and 32 are in their unactivated states and transmit the fluid entering their common ports through their normally open ports or the fluid entering their normally open ports through their common ports depending upon the directional flow through the valves. Fuel exits tank 12 via line 14 which is coupled to pump 16 resulting in the feeding of fuel under pressure through filter 20. The filter 20 passes fuel through valve 22 and valve 24 to injection pump of 26 which feeds fuel to the injectors.

The normally closed port NC of pump of valve 22 is coupled by a line 38 to a mixing chamber 40, which is merely a hollow chamber with a plurality of lines connected to it. Liquid in mixing chamber 40 exits mixing chamber 40 by a line 42 and enters pump 44 which delivers its output into line 46. Line 46 is coupled to the normally closed port of valve 24. That portion of the fluid exiting pump 44 which does not remain in line 46 is sent into line 48 and passes through a transducer 50 which measures the fuel/water ratio and provides this information to a control circuit 52. After passing through transducer 50, the fluid passes through a relief valve 54. Relief valve 54 is of the type which will allow fluid to pass through to it only when the pressure in line 48 and, accordingly, the pressure in line 46 is above a predetermined value, thus, effectively maintaining the pressure in line 46 at a desired value. This pressure is typically on the order of forty PSIA which is slightly higher than the pressure produced by pump 16, which is thus prevented from feeding fuel via valve 22 into the mixing chamber 40 in the event that excess fluid is being released from line 46 into line 48, as will be described below in connection with the operation of the system in the emulsified fuel mode. The output of relief valve 54 is in turn fed into mixing chamber 40.

Water is stored in tank 56. The output of tank 56 is coupled by a line 58 to pump 60. Pump 60 delivers the water to line 62 which, in turn, is coupled to a valve 64 which has a common port C and a normally closed port NC. In its deactivated state, valve 64 is closed and does not pass fluid from its common port C to its normally closed port NC. Fluid passing into line 62 which does not pass through valve 64 is returned to tank 56 via a line 66 which is coupled to tank 56 via a relief valve 68. Relief valve 68 is essentially identical to relief valve 54, whereby it maintains a desired pressure in line 62. This pressure is in turn coupled to line 70 to the normally closed port of valve 64. Valve 68 is required because line 70 is coupled to the mixing chamber and the desired valve pressure must be maintained. In the event that valve 64 is activated, its common port C is coupled to its normally closed port NC. The activation of valve 64 is controlled by the control circuit 52. Excess fuel leaving the injectors 28 and the injection pump 26, passing through line 30 and through the common and normally closed ports of valve 32 during activation of valve 32 is coupled by line 72 to a relief valve 74 and then to mixing chamber 45 by line 76. Relief valve 74 is substantially identical to the valve 54 whereby the desired back pressure in mixing chamber 40 is maintained.

After the engine has been running for a time in the conventional mode by operating on pure fuel, as discussed above, it may be desired to switch the engine to the emulsified fuel mode in which the engine will run on an emulsion of water and fuel. The same is achieved by activating valves 22, 24 and 32, and starting pumps 60 and 44. In their activated states the common ports C of the valves are coupled to the normally closed ports NC. In this state pump 16 feeds fuel from tank 12 into filter 20. The output of filter 20 is sent to valve 22. The excess from filter 20 is returned via line 34 to line 36 and then to tank 12. Because valve 32 is in its activated state its normally open port NO is closed and no fluid is returned to the tank by line 78.

After leaving filter 20, fuel passes through the common port C of valve 22 to its normally closed port NC from thence through line 38 into mixing chamber 40.

Water is fed from tank 56 by line 58 by a pump 60 which couples the water to valve 64. Excess water is returned by a line 66 and relief valve 68 to tank 56. When valve 64 is in the activated state, the water passes into line 70 which couples it to the mixing chamber where it mixes with the oil fed by line 38. The mixture enters line 42 and is fed into the input of pump 44. Pump 44 is a conventional pump of the gear type which, inherently, as part of the pumping cycle, subjects the mixture of fuel and water entering from line 42 to a great deal of agitation, thus producing a very thorough emulsion. The rate at which pump 44 pumps fluid is substantially greater than the rate at which the engine consumes the emulsion. Accordingly a small part of the emulsion enters line 46 and travels into the normally closed port NC valve 24 which in its activated state passes the emulsion to the injection pump, which feeds ejectors 28 and returns excess emulsion by line 30 to the common port on valve 32.

Likewise, because pump 44 pumps at a rate much greater than that required by injectors 28, the bulk of the emulsion leaving pump 44 enters line 48 passing through transducer 50 and relief valve 54 into mixing chamber 40. Mixing chamber 40 receives fuel via line 38, water via line 70, and excess emulsion via line 76 and relief valve 54. Thus, the emulsion is constantly being recirculated to the extent that it is not consumed. The fuel and water is maintained in an emulsified form without the use of an emulsifying agent by the pump 44 with oil and water being added continuously to replace that part of the emulsion, used to fuel the injectors. The proper ratio of water to fuel in the emulsion is maintained by opening and closing valve 64 thus, respectively, increasing or decreasing the relative amount of water in the emulsion. Valve 64 is opened and closed by control circuit 52 which measures the water to fuel ratio via transducer 50, as will be described below.

Figure 2:
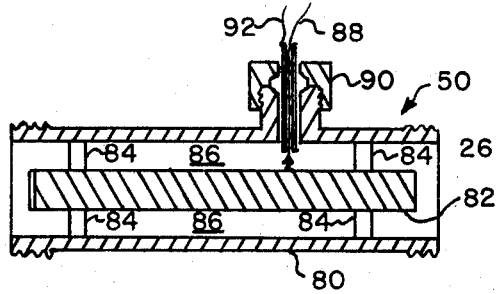
FIG. 2 is a transducer useful in the embodiment illustrated in FIG. 1.
Figure 3:
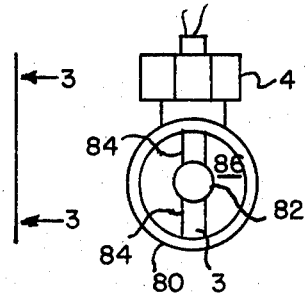
FIG. 3 is view of the transducer along lines 3—3 of FIG. 2.

The operation of the transducer may be understood with reference to FIGS. 2 and 3. Transducer 50 comprises an outer conduit 80 made of a conductive material and inner cylindrical member 82 also made of a conductive material. Inner member 82 is supported within outer conduit 80 by a multiplicity of insulative support members 84. The water/fuel ratio of the emulsion is measured by passing the emulsion through the annular space 86 defined between member 82 and conduit 80. This is most easily done by interposing transducer 50 within line 48 whereby the fluid passing through line 48 pass through annular space 86.

Water is known to have a relatively low dielectric constant. Oil on the other hand has a high dielectric constant. Emulsions of water and oil have intermediate dielectric constants. The dielectric constant of the emulsion is a function of the water/fuel ratio. In turn, the capacitance between inner member 82 and conduit 80 is a function of the dielectric constant of the emulsion passing through annular space 86.

An insulated wire 88 passes through a fitting 90 and is electrically connected to the member 82. A second wire 92 is electrically connected to fitting 90 which in turn is electrically coupled to conduit 80. Wires 88 and 92 are, in turn, coupled to control circuit 52 which uses a capacitive bridge to measure the capacitance between inner member 82 and conduit 80, which is a function of the dielectric constant of the emulsion in annular space 86, which in turn is a function of the water/fuel ratio. For a desired water/fuel ratio a desired capacitance must be achieved. Accordingly, if the capacitance is too high valve 64 is opened introducing water lowering the dielectric constant of the emulsion and lowering the capacitance. If the capacitance measured is too low valve 64 is closed, thereby cutting off the supply of water increasing the amount of oil being recirculated through loop 94 and increasing the fuel/water ratio.

It has been found that decreasing the distance between conduit 80 and member 82 increases the capacitance, but makes that capacitance unstable. Best results appeared in an experimental model when the separation was on the order of 1.4 cm. with the selection of conduit 80 having an outer diameter of 2.184 cm., having an inner diameter of 2.004 cm. and a member 82 having a diameter of 6.61 cm. and a length of 22.225 cm. Naturally these values may be varied as they are not critical. Generally, it has been found that the separation should be maintained above a minimum value, typically above one cm.

A greater level of sophistication may be achieved by coupling control circuit 52 to the accelerator pedal 96 or speedometer 98 and adjusting the water/fuel ratio depending upon the state of the engine. For example, at relatively high speeds or when a relatively large amount of fuel of being fed to the engine it may be desirable to increase the amount of water, while under other conditions it may be desirable to increase the fuel/water ratio. Likewise, a condensor 100 may be used to remove water from combustion products produced by the exhaust system 102, which water would then be fed to water tank 56. While a preferred embodiment of the invention has been described, it is, of course, understood that various modifications of the disclosed structure will be obvious to those of ordinary skill in the art in view of the disclosure herein. These modifications are within the spirit and scope of the invention which is limited and defined only by the appended claims.

I claim:

1. A system for generating an emulsified fuel, comprising:
    (a) first reservoir means for containing a quantity of fuel component;
    (b) second reservoir means for containing a quantity of a non-combustible emulsion component;
    (c) chamber means defining an output and a mixing chamber having an input for receiving said fuel component and said non-combustible emulsion component and outputing both of said components at its output;
    (d) first means for providing said non-combustible component to said chamber means;
    (e) second means for providing said fuel component to said chamber means;
    (f) emulsifier means for receiving at its input both of said components from the output of said chamber means, and providing an emulsion at its output;
    (g) third means for providing both of said components from the output of said chamber means to the emulsifier means;
    (h) fourth means for providing at least a portion of the output of said emulsifier means to a device which consumes the emulsion of said fuel component an said non-combustible component;
    (i) recirculation means for receiving that portion of said emulsion not provided to said device and returning it to said chamber means, allowing said portion not provided to said device to be returned to the emulsifier means;
    (j) measurement means for measuring the ratio of the amount of said fuel component to the amount of said non-combustible component in said recirculation means; and
    (k) control means responsive to said measurement means to vary the flow of said components to control said ratio.

2. A system as in claim 1, wherein said measurement means comprises a conduit portion for receiving and transmitting said portion of said emulsion not provided to said device, said conduit portion including a pair of conductive members insulated from each other and positioned in facing relationship to each other with the flow of said portion of said emulsion not provided to said devices between them and capacitance measurement means for measuring the capacitance between said pair of conductive members and providing a control signal to said control means.

3. A system as in claim 2, wherein said device is an internal combustion engine and wherein said control means varies said ratio in response to the output of said engine.

4. A system as in claim 2, wherein said device is an internal combustion engine and said control means varies said ratio in response to the amount of emulsion being consumed by the engine.

5. A system as in claim 2, wherein said fuel component is hydrocarbon and wherein said second reservoir means is a condensation device which removes water from the combustion products of said device.

6. A system as in claim 2 wherein said conductive members are separated by a distance greater than one cm.

7. A system as in claims 1 or 2 wherein said emulsifier means is a pump.

8. A system for generating an emulsified fuel, comprising:
(a) first reservoir means for containing a quantity of a fuel component;
(b) second reservoir means for containing a quantity of a non-combustible emulsion component;
(c) chamber means defining an output and a mixing chamber having an input for receiving said fuel component and said non-combustible emulsion component and outputting both of said components at its output;
(d) first means for providing said non-combustible component to said chamber means;
(e) second means for providing said fuel component to said chamber means;
(f) emulsifier means for receiving at its input both of said components from the output of said chamber means, and providing an emulsion at its output;
(g) third means for providing both of said components from the output of said chamber means to the emulsifier means;
(h) fourth means for providing at least a portion of the output of said emulsifier means to a device which consumes the emulsion of said fuel component and said non-combustible component;
(i) measurement means for measuring the ratio of the amount of said fuel component to the amount of said non-combustible component exiting said fourth means; and
(j) flow control means responsive to said measurement means to vary the flow of said components to control said flow.

* * * * *